United States Patent
Wigard et al.

(10) Patent No.: US 7,489,691 B2
(45) Date of Patent: Feb. 10, 2009

(54) SCHEDULING RETRANSMISSION IN ACCESS NETWORKS

(75) Inventors: Jeroen Wigard, Aalborg (DK); Troels Kolding, Klarup (DK); Preben Mogensen, Gistrup (DK); Pablo Ameigeiras, Aalborg (DK); Woonhee Hwang, Helsinki (FI); Hannu Häkkinen, Espoo (FI)

(73) Assignee: Nokia Corporation, Espoo (FI)

( * ) Notice: Subject to any disclaimer, the term of this patent is extended or adjusted under 35 U.S.C. 154(b) by 690 days.

(21) Appl. No.: 10/325,736

(22) Filed: Dec. 23, 2002

(65) Prior Publication Data
US 2004/0120306 A1    Jun. 24, 2004

(51) Int. Cl.
*H04L 12/56*    (2006.01)
(52) U.S. Cl. .................... 370/395.42; 370/230.1; 370/395.4; 370/412
(58) Field of Classification Search ................. 370/229, 370/230, 230.1, 235, 236, 310, 310.1, 328, 370/338, 351, 356, 389, 395.4–395.43, 400, 370/401, 410, 412, 428, 429
See application file for complete search history.

(56) References Cited

U.S. PATENT DOCUMENTS

| 6,885,638 | B2 * | 4/2005 | Xu et al. ............... 370/230 |
| 2002/0071407 | A1 * | 6/2002 | Koo et al. ............. 370/335 |
| 2002/0075841 | A1 * | 6/2002 | Steer et al. ........... 370/344 |
| 2002/0126675 | A1 * | 9/2002 | Yoshimura et al. ..... 370/395.21 |
| 2002/0137521 | A1 | 9/2002 | Kim et al. |
| 2003/0007480 | A1 * | 1/2003 | Kim et al. ............. 370/349 |
| 2003/0016698 | A1 * | 1/2003 | Chang et al. ........... 370/469 |

FOREIGN PATENT DOCUMENTS

| EP | 994634 A2 * | 4/2000 |
| WO | WO 02/069547 A1 | 9/2002 |
| WO | WO 02/087131 A2 | 10/2002 |
| WO | WO 02/091633 A1 | 11/2002 |
| WO | WO 03036844 A2 * | 5/2003 |

OTHER PUBLICATIONS

Raitola, M. et al., "Wideband CDMA Packet Data with Hybrid ARQ," IEEE 5th International Symposium on Spread Spectrum Techniques and Applications. Sep. 1998. vol. 1, pp. 318-322.*
Jin, Sang-Min et al., "Performance Analysis of Separated/Combined Air Interface Protocol Structure for IMT2000 System," Global Telecommunications Conference 1999, GLOBECOM '99. vol. 5, pp. 2678-2682.*
Philips: "Comparison of HSDPA Schedulers", 3GPP TSG RAN WG1 #25, TDOC R1-02-0579, Apr. 9-12, 2002, pp. 1-6, XP002272787.
Nokia: "QoS control in HSDPA in Iub interface and Issues on streaming", TSG-RAN WG2 #32 Meeting, TDOC R2-022607, Sep. 23-27, 2002, pp. 1-7, XP002272788.

* cited by examiner

*Primary Examiner*—Chi H Pham
*Assistant Examiner*—Donald L Mills
(74) *Attorney, Agent, or Firm*—Foley & Lardner LLP

(57) ABSTRACT

The present invention relates to a method and system for scheduling data packets in a base station device of an access network. An information indicating a retransmission status of a data packet is provided to the base station device, and a scheduling priority is allocated to the data packet based on the retransmission status information. Thereby, retransmission packets can be scheduled earlier and round trip times can be reduced, so as to decrease the risk of timeouts and stalling and to loosen buffer requirements.

25 Claims, 4 Drawing Sheets

SCHEDULING RETRANSMISSION IN ACCESS NETWORKS

BACKGROUND OF THE INVENTION

1. Field of the Invention

The present invention relates to a method and system for scheduling data packets in a base station device of an access network which provides access to a packet data network.

2. Description of the Prior Art

Within the International Telecommunications Union (ITU), several different air interfaces are defined for third generation mobile communication systems, based on either Code Division Multiple Access (CDMA) or Time Division Multiple Access (TDMA) technology. Wideband CDMA (WCDMA) is the main third generation air interface and will be deployed in Europe and Asia, including Japan and Korea, in the same frequency band, around 2 GHz.

The WCDMA air interface has been defined to provide, in the first phase, data rates up to 2 Mbps in the 3GPP (third generation partnership project) Release 99 and Release 4 specifications. In the Release 5 specification, peak data rates up to 10 Mbps are possible with a High Speed Downlink Packet Access (HSDPA) feature to thereby support packet-based multimedia services. In HSDPA, the intelligence of the base station device or Node-B (which is the third generation equivalent to the former base station) is increased for handling of retransmissions and scheduling functions, Thereby, L1 retransmission between the user equipment (UE, which is the third generation equivalent to the former mobile station) and Node-B are introduced and the round trip delay of these are lower than 'normal' RLC retransmission round trip delays. However there will still be (a little fraction of) RLC retransmission also for HSDPA. This makes retransmission combining feasible in the mobile device due to reduced memory requirements. In general, all HSDPA users share the channel in both time and code domains. Adaptive modulation and coding is used to support multiple rate transmissions for different types of multimedia services.

With HSDPA, the Node-B is responsible for scheduling different users on the High Speed Downlink Shared Channel (HS-DSCH) and as such, the user data to be scheduled must to some extent be buffered in advance in the Node-B. The user data is sent from the RNC to the Node-B by means of a mapping operation between a packet data unit of the Radio Link Control protocol layer, i.e. RLC-PDU, and a packet data unit of the Medium Access Control protocol layer, i.e. MAC-d-PDU, which is transmitted over the Iub or Iur interface, i.e. the interfaces between the RNC and the Node-B and between different RNCs, respectively. When the data has been sent to the Node-B, the RNC is unaware of its status until it receives a response or acknowledgment. In particular, the sender side polls the receiver which on its turn answers with a status report, telling the status of the outstanding RLC blocks, after some significant time delay. The RLC layer response algorithm can be controlled using the so-called polling bit, but some minimum delay is inherent to the network.

To provide the highest system capacity gain, it is assumed in 3GPP standardization that the so-called proportional fast scheduling strategies will be employed. This scheduling method chooses that user for scheduling, which has the best relative channel quality at a given time, thereby optimizing cell throughput while providing the users with approximately the same access probability to the channel. The basic concept for this type of scheduling is "multi-user diversity"; e.g. the ability to choose the best user from a large set of users. Hence, for this method to work optimally, it is important that the scheduler can pick the most optimum user at any given time instance which means that an excess amount of data, compared to what is actually scheduled on the channel, has to reside in the Node-B MAC-hs buffer.

However, the provision of such large buffers leads to the following problems:

At some point, RLC PDUs, which are located in the Node-B may be retransmitted by an RLC retransmission from the RNC. The reason for this is that in the status report it is indicated that there are some RLC blocks missing. It should be noted that the RNC does not know whether the data is still waiting to be scheduled in the Node-B, whether it was sent but the UE failed to detect it, or whether the uplink response or acknowledgement was lost during transmission from the UE. If there are always provided e.g. 3-4 times as much data as the average capacity stored in the Node-B in order to facilitate sufficient multi-user diversity, substantial data sent over the Iub/Iur interface has to be retransmitted, which leads to an excessive and highly undesirable load on this link. It is however noted that the RLC layer will only retransmit missing blocks and not all blocks. It is thus a selective retransmission algorithm.

Non-real time (NRT) services are often running over services which use the Transport Control Protocol (TCP). TCP has its own congestion avoidance algorithm, including features like fast retransmissions, timeouts, etc. TCP timeouts works as follows: Every time a TCP segment is sent, a timer is started. This timer is compared to the RTO (retransmission timeout), which equals the filtered estimated TCP RTT (round trip time) plus 4 times the filtered estimated variance of the TCP RTT. If the timer is exceeding the RTO value, congestion actions are started, as TCP assumes the segment to be lost or delayed due to congestion. These congestion actions consist among others of retransmitting all segments from the segment in question and starting the slow start algorithm. TCP slow starts are undesirable since they lead to low utilization of the transmission medium. From the above it can be understood that sudden very large delays for some blocks may lead to TCP timeouts. The delay caused by a RLC retransmission is considerable, since the retransmission is put at the back of the queue in the Node-B. Since RLC retransmissions only happen very seldom, the RTO algorithm cannot adjust to them. Thus, an RLC retransmission creates a sudden delay increase which may be interpreted by TCP as congestion, leading to undesirable congestion actions.

The RLC transmission is based on an RLC window. The working of this can be explained with an example, which is shown in FIG. 7. The amount of out-standing data can never be more than the size of the window. As soon as the latest block (most to the right) is acknowledged the window is shifted, so that new data can come in. In the example of FIG. 7, the last oldest block (hatched with a left tilt) in a window of an RLC 30, 32 is negatively acknowledged. Therefore, this block is retransmitted. All horizontally hatched blocks have positively been acknowledged, whereas the hatched blocks with a right tilt are waiting for acknowledgement. They can be in the buffer of a Node-B 20, 22, in the air interface or their acknowledgement can be on its way. The block with the retransmission, without the invention, will be put at the end of the queue in the Node-B 20, 22, which means that the time spend before a positive acknowledgement is received will increase. Before this block is acknowledged, the RLC 30, 32 cannot send any new blocks since this block is the last block in the RLC window. This is called stalling and leads to a lower throughput for the user.

SUMMARY OF THE INVENTION

The present invention provides a scheduling scheme for access networks, by means of which retransmission delay can be decreased even with large buffer storage at the Node-B.

A method of scheduling data packets in a network device of an access network in accordance with the invention, comprises the steps of:
  providing to the network device an information indicating a retransmission status of a data packet; and
  allocating a scheduling priority to the data packet based on the retransmission status information.

Furthermore, a system for scheduling data packets in an access network in accordance with the invention, comprises:
  at least one network controller device for providing an information indicating a retransmission status of a data packet; and
  at least one network device for allocating a scheduling priority to the data packet based on the retransmission status information.

Accordingly, retransmitted data packets can be prioritized during scheduling to thereby reduce the retransmission delay and increase the throughput as seen by the application or user. Large buffer storages can thus be allowed for at the base station devices, while the risk of RLC stalling and TCP retransmission is minimized.

The information may be provided as a flag information in a payload portion or in a header portion of a data frame comprising the data packet. This flag information can be allocated to the data packet. It may indicate whether the data packet or the data frame, respectively, is retransmitted or not. Thereby, a straightforward solution requiring minor modifications at the network controller devices can be provided. Any spare bit in the header or payload portion can be used to convey the flag information set by a dedicated setting operation at the network controller device.

As an alternative, the information may be provided in an out-band signaling.

The data packet may be a MAC-d PDU, and the data frame may be an HS-DSCH data frame. The provided information may be set based on a corresponding information received from the RLC protocol layer.

Furthermore, the allocation step may comprise the step of placing the data packet at a predetermined position in a buffer queue of the base station device. Specifically, the data packet may be placed to the front position of the buffer queue if the provided information indicates a retransmission. The allocation step may comprise the step of adjusting a reordering of the buffer queue if the information indicates a retransmitted data packet.

Alternatively, the allocation step may comprise the step of placing the data packet based on the provided information either to a retransmission buffer or to a first-transmission buffer. Then, data packets stored in the first-transmission buffer are scheduled when the retransmission buffer is empty. Hence, the network device may be arranged to schedule data packets of the first-transmission buffer after all data packets of the retransmission buffer have been schedule.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

Figure 1:
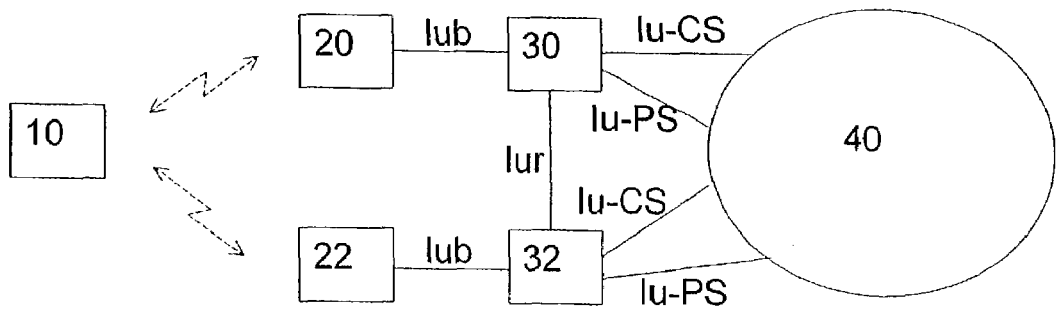
FIG. 1 shows a schematic diagram of a network architecture in which the present invention can be implemented.

The embodiments of the present invention will now be described on the basis of a third generation WCDMA radio access network architecture as shown in FIG. 1.

FIG. 1 shows a terminal device or UE 10 connected via an air interface to a first Node-B 20 and/or a second Node-B 22. The first and second Node-Bs 20, 22 are connected via respective Iub interfaces to first and second radio network controllers (RNCs) 30, 32 which are connected to each other via a Iur interface. The Node-Bs 20, 22 are logical nodes responsible for radio transmission and reception in one or more cells to/from the UE 10 and terminate the Iub interface towards the respective RNCs 30, 32. The RNCs 30, 32 are in charge of controlling use and integrity of radio resources within the radio access network. Furthermore, the RNCs 30, 32 provide connections to a third generation core network 40, e.g. a UMTS (Universal Mobile Telecommunications System) network for both circuit-switched traffic via a Iu-CS interface and packet-switched traffic via a Iu-PS interface. The existence of an open standardized Iur interface is essential for proper network operation, including soft handover support in a multi-vendor environment.

According to the embodiments of the present invention, a mechanism is provided to put data packets of RLC retransmissions in front of a buffer queue of a scheduling function provided in the Node-Bs 20, 22 and related to the relevant traffic stream. To achieve this, a retransmission flag RF is introduced indicating a retransmission of the concerned data packet or data frame. Of course, other indication methods based on in-band and/or out-band signaling, i.e. within the concerned user channel and/or via a separate control channel, can be used as well. The Node-Bs 20, 22 can then adjust a reordering of the queue of data packets, if a data packet with a set retransmission flag arrives. An alternative is that the Node-B uses two queues per traffic stream. One can be used for first transmissions and the other for RLC retransmissions. Once a user is to be scheduled, data is first read out of the retransmission buffer. When this one is empty, the original data can be scheduled.

These measures allow for large buffer storage in the Node-Bs 20, 22 and therefore fast scheduling while simultaneously minimizing the RLC retransmission time. This provides the advantage that the risks of TCP timeouts and RLC stalling are reduced, while L2 buffer requirements are loosened, since retransmission acknowledgments arrive faster due to the reduced RTT.

At the RNCs 30, 32, MAC layer processing sets the retransmission flag RF for a retransmitted data packet or data frame.

Figure 2:
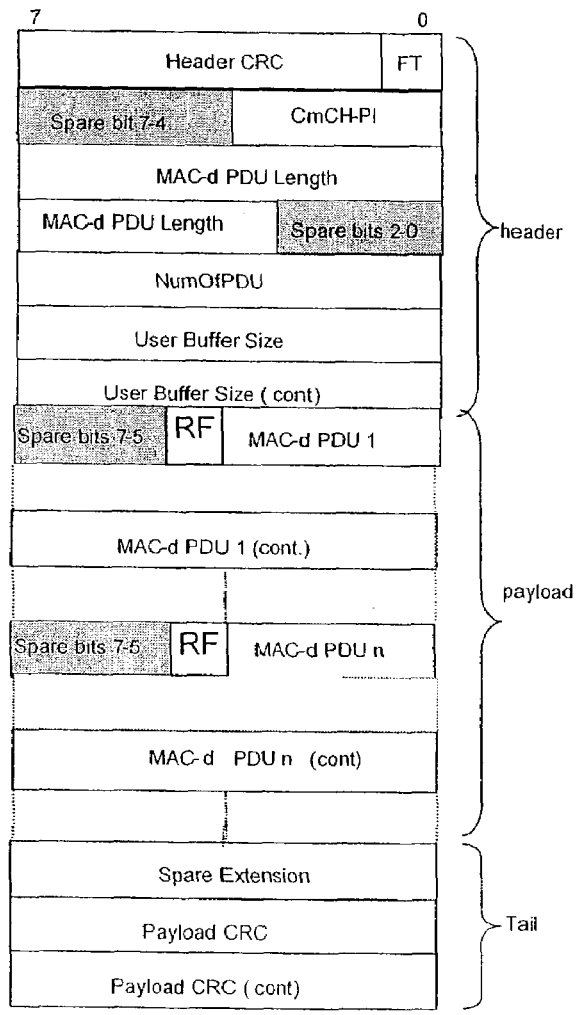
FIG. 2 shows a schematic diagram of a frame structure according to a first embodiment.

FIG. 2 shows a first embodiment of a structure of an HS-DSCH data frame, where each MAC-d PDU has an allocated RLC retransmission flag RF. As can be gathered from FIG. 2, retransmission flags RLC are provided for each MAC-d PDU in the payload portion of the data frame. Some of the spare bits available in the data frame can be used as RLC retransmission flags. The first embodiment relates to the case that each MAC-d PDU can be marked as an RLC retransmission or not. The RLC retransmission flag is set by the MAC-d protocol layer according to the retransmission status of the concerned MAC-d PDU, which the MAC-d protocol layer derives or obtains from the RLC layer. In the present embodiments, one bit is used per MAC-d PDU, which contains one RLC PDU. The location of the bit of the retransmission flag RF can be just in front of the MAC-d PDU. However, it can also be located at some other place. In FIG. 2, spare bit No. 4, of the spare bits in front of each MAC-d PDU is used as the retransmission flag RF. For example, if the retransmission flag RF is set to "1", the respective MAC-d PDU is a retransmitted data packet, and if it is set to "0", the respective MAC-d PDU is transmitted for the first time. Of course, the opposite setting logic may be used as well.

Figure 3:
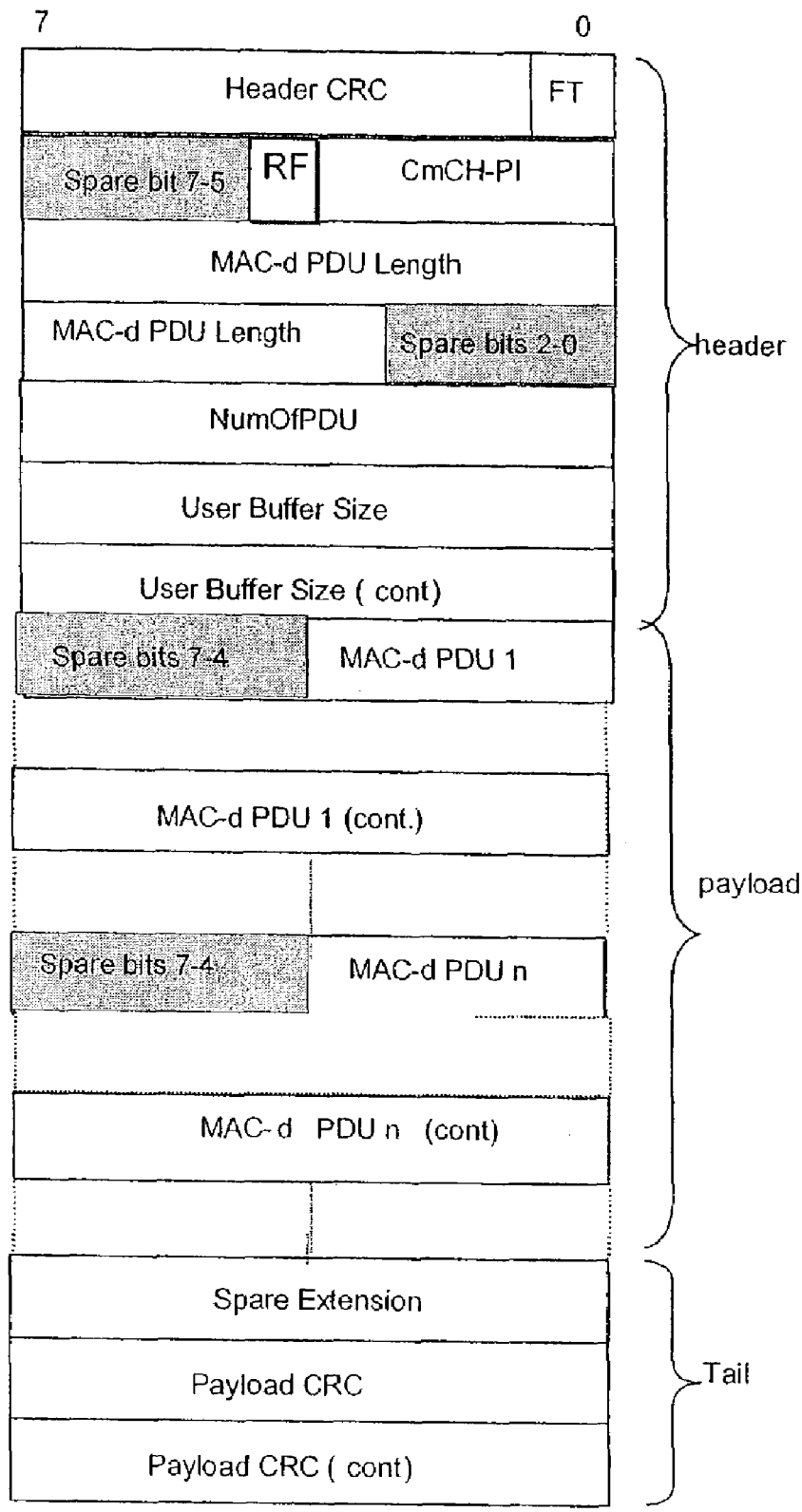
FIG. 3 shows a schematic diagram of a frame structure according to a second embodiment.

FIG. 3 shows a second embodiment of the structure of the HS-DSCH data frame, where one HS-DSCH data frame has only one RLC retransmission flag RF allocated to the whole data frame, i.e. to all MAC-d PDUs in the payload portion. In this case, there is only one RLC retransmission flag provided in the header portion of the data frame. This means that all the MAC-d PDUs in the payload portion of the HS-DSCH data frame are retransmission packets in case the RLC retransmission flag is set.

Figure 4:
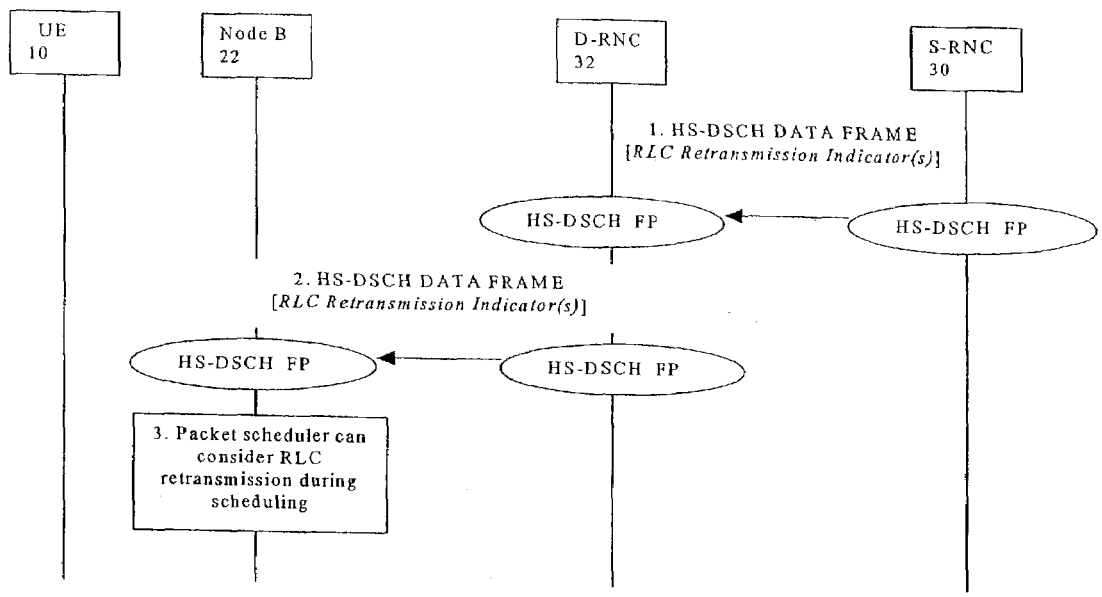
FIG. 4 shows a schematic diagram of a signaling procedure for forwarding a retransmission information according to the first and second embodiments.

FIG. 4 shows an example of a signaling and processing flow in case RLC retransmission flag(s) RF is/are included in the HS-DSCH data frame. This signaling flow covers both of the above first and second embodiments.

In the example of FIG. 4, one of the RNCs 30, 32 of FIG. 1, e.g. the lower RNC 32, is a Drift RNC (D-RNC), and the other, e.g. the upper RNC 30, is a serving RNC (S-RNC), as regarded from the viewpoint of the UE 10. The S-RNC 30 is in charge of the RRC (Radio Resource Control) connection between the UE 10 and the radio access network. Thus, the S-RNC 30 terminates the Iu connection. The D-RNC 32 supports the S-RNC 30 with radio resources when the connection between the radio access network and the UE 10 needs to use cell(s) controlled by the D-RNC 32, e.g, via the Node-B 22. According to FIG. 4, the S-RNC 30 generates a HS-DSCH data frame with a retransmission flag setting as RLC retransmission indicator and forwards the data frame to the D-RNC 32 using an HS-DSCH frame protocol (HS-DSCH FP) signaling (step 1). Then, the D-RNC 32 forwards the HS-DSCH data frame to the Node-B 22 again using the HS-DSCH FP signaling (step 2). At the Node-B 22, a packet scheduling functionality or packet scheduler considers the retransmission flag setting during its scheduling operation (step 3). If the UE 10 is located within the coverage area of the cells controlled by the S-RNC 30, the HS-DSCH data frame can be forwarded directly to the UE 10.

Once the Node-B 22 has received the flag information RF, it will utilize it during the packet scheduling. Methods of prioritizing RLC retransmissions in the Node-Bs 20, 22 are described in the following based on FIGS. 5 and 6. However, other methods of prioritizing RLC retransmissions are possible.

Figure 5:
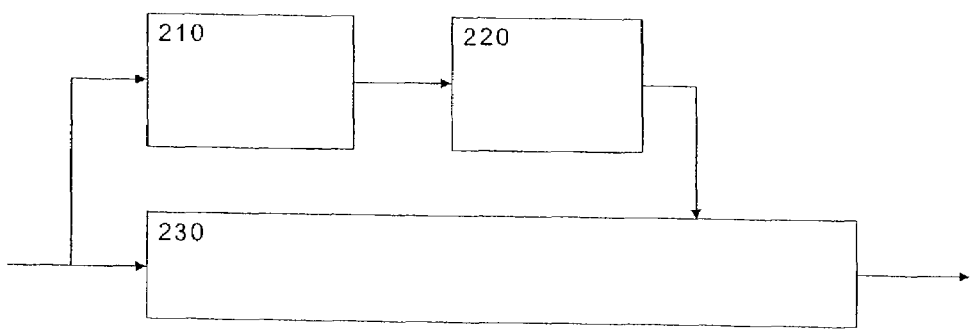
FIG. 5 shows a schematic block diagram of a scheduling function according to a first example.
Figure 6:
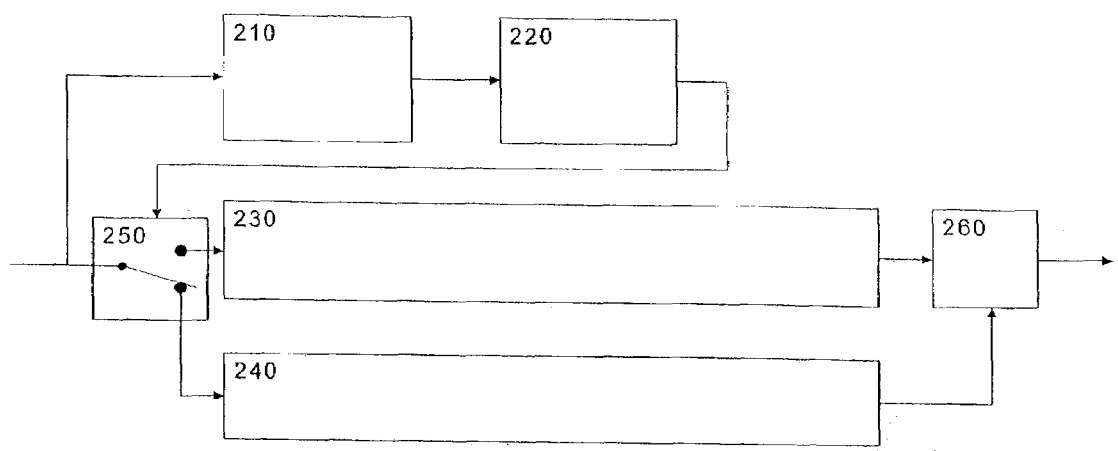
FIG. 6 shows a schematic block diagram of a scheduling function according to a second example.
Figure 7:
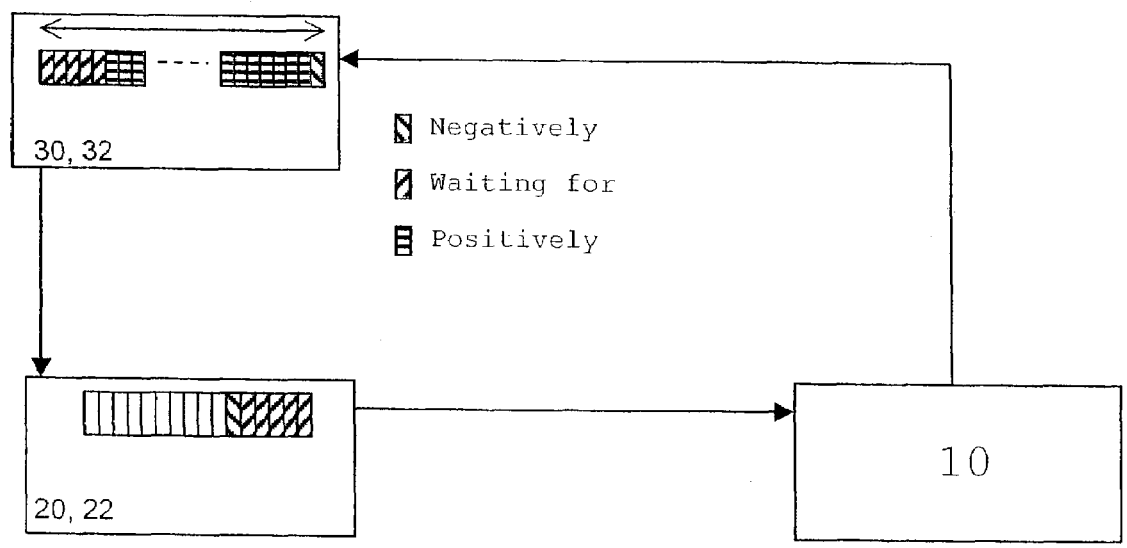
FIG. 7 shows a schematic block diagram of a conventional window-based RLC transmission with a stalling situation.

The manner in which queued data packets are selected for transmission on the link is known as link scheduling discipline. FIGS. 5 and 6 show first and second examples of a queuing model abstraction, e.g. for a Fist-in-First-out (FIFO) link scheduling principle. Packets arriving at the link output queue are queued for transmission if the link is currently busy transmitting another packet. The conventional scheduling function selects packets for link transmission in the same order in which they arrived at the link queue.

FIG. 5 shows a scheduling function according to the first example which can be used in connection with both first and second embodiments. The Node-Bs 20, 22 comprise a checking functionality or unit 210 for checking the retransmission flag setting of a received data frame or data packet. Based on the detected flag setting, a scheduler functionality 220 is controlled so as to allocated a scheduling priority to the concerned data packet or data frame, e.g., by adjusting the queue order of data packets in a buffer memory 230 to place retransmitted data packets at a front position of the queue. Thereby, the queue of data packets in the buffer memory 230 is reordered to prioritize retransmitted data packets. In particular, retransmitted data packets may be placed in front of the queue.

FIG. 6 shows a scheduling function according to the second example which also can be used in connection with both first and second embodiments. Here, two buffer memories 230, 240 are provided, i.e. a retransmission buffer memory 240 for storing retransmitted data packets and a first-transmission buffer memory 230 for storing data packets transmitted for the first time. Furthermore, a controllable switching functionality 250 is provided which can be controlled by the scheduler 220 in response to the checking result of the checking unit 210 so as to switch or place the received data packet to one of the buffer memories 230, 240 based on the setting of the allocated retransmission flag RF. A switching unit which implements the switching functionality 250 may be implemented as hardware function, e.g. a demultiplexer, a semiconductor switch or a logical gate, or a software function controlling a memory read/write operation. The scheduler functionality 220 schedules the data packets stored in the retransmission buffer memory 240 at first. Then, a selection functionality 260 can be provided which selects the first-transmission buffer 230 as soon as the retransmission buffer memory 240 is empty, so that the non-retransmitted data packets are then scheduled by the scheduler 220. As an alternative, the selection of the selection functionality 260 may be provided by the scheduler functionality 220, such that the selection functionality 260 can be dispensed with.

The scheduling functionalities according to the above first and second examples may be implemented in the Node-Bs 20, 22 as concrete hardware functions or as software routines controlling a processing unit with an allocated read/write or random access memory. Further details regarding implementation of such queuing and scheduling architectures can be gathered for example from James F. Kurose et al, "Computer Networking: A Top-Down Approach Featuring the Internet", Addison Wesley Longman, Inc., 2001.

It is noted that the present invention is not restricted to the above preferred embodiments but can be used in any network device having a scheduling functionality. Moreover, any kind of signaling can be used for forwarding the retransmission information to the scheduling network element. The preferred embodiments may thus vary within the scope of the attached claims.

The invention claimed is:
1. A method comprising:
providing to a network device of an access network an information indicating a retransmission status of a data packet; and
allocating a scheduling priority to the data packet based on the retransmission status information, wherein said retransmission status information is provided for each data packet of a payload portion of a data frame, wherein the information is provided as a flag information in a payload portion of a data frame comprising the data packet, and the flag information is allocated to the data packet, and wherein said allocating comprises placing the data packet at a front position in a buffer queue of said network device if the provided information indicates a retransmission.

2. A method according to claim 1, wherein the flag information indicates whether the data packet is retransmitted or not.

3. A method according to claim 1, wherein the flag information indicates whether the data frame is retransmitted or not.

4. A method according to claim 1, wherein the data packet is a MAC-d PDU.

5. A method according to claim 1, wherein the data frame is a HS-DSCH data frame.

6. A method according to claim 1, wherein the information is set based on a corresponding information received from the RLC protocol layer.

7. A method according to claim 1, wherein said allocating comprises adjusting a reordering of a buffer queue of the network device if the information indicates a retransmitted data packet.

8. A method according to claim 1, wherein said allocating comprises placing the data packet based on the provided information either to a retransmission buffer or to a first-transmission buffer.

9. A method according to claim 8, wherein data packets stored in the first-transmission buffer are scheduled when the retransmission buffer is empty.

10. A system comprising:
   at least one network controller device in an access network which device provides an information indicating a retransmission status of a data packet; and
   at least one network device allocating a scheduling priority to the data packet based on the retransmission status information,
   wherein said retransmission status information is provided for each data packet of a payload portion of a data frame,
   wherein the at least one network controller device provides the information as a flag information in a payload portion of a data frame comprising the data packet, and allocates the flag information to the data packet, and
   wherein said allocating comprises placing the data packet at a front position in a buffer queue of said network device if the provided information indicates a retransmission.

11. A system according to claim 10, wherein the network device is a Node-B device, the network controller device is a radio network controller device (10), and the access network is a radio access network.

12. A system according to claim 10, wherein the network device allocates the scheduling priority by placing the data packet either to a retransmission buffer or to a first-transmission buffer, based on the provided information.

13. A system according to claim 12, wherein the network device schedules data packets of the first-transmission buffer after all data packets of the retransmission buffer have been scheduled.

14. A network device configured to be used in a system according to claim 10.

15. A network device according to claim 14, wherein the network device is a base station device.

16. A network controlling device configured to be used in a system according to claim 10.

17. An apparatus, comprising:
   a provider configured to provide a network device of an access network an information indicating a retransmission status of a data packet; and
   an allocator configured to allocate a scheduling priority to the data packet based on the retransmission status information,
   wherein said provider is configured to provide said information for each data packet of a payload portion of a data frame,
   wherein said provider is configured to provide said information as a flag information in a payload portion of a data frame comprising the data packet, and the flag information is allocated to the data packet, and
   wherein said allocator is configured to place the data packet at a front position in a buffer queue of said network device if the provided information indicates a retransmission.

18. An apparatus according to claim 17, wherein the flag information indicates whether the data packet is retransmitted or not.

19. An apparatus according to claim 17, wherein the flag information indicates whether the data frame is retransmitted or not.

20. An apparatus according to claim 17, wherein the data packet is a MAC-d PDU.

21. An apparatus according to claim 17, wherein the data frame is a HS-DSCH data frame.

22. An apparatus according to claim 17, wherein the information is set based on a corresponding information received from the RLC protocol layer.

23. An apparatus according to claim 17, wherein said allocator is configured to adjust a reordering of a buffer queue of the network device if the information indicates a retransmitted data packet.

24. An apparatus according to claim 17, wherein said allocator is configured to place the data packet based on the provided information either to a retransmission buffer or to a first-transmission buffer.

25. An apparatus according to claim 17, wherein data packets stored in the first-transmission buffer are scheduled when the retransmission buffer is empty.

* * * * *